United States Patent
Moussaoui et al.

(10) Patent No.: US 7,944,192 B2
(45) Date of Patent: May 17, 2011

(54) HYSTERETIC POWER-SUPPLY CONTROLLER WITH ADJUSTABLE SWITCHING FREQUENCY, AND RELATED POWER SUPPLY, SYSTEM, AND METHOD

(75) Inventors: Zaki Moussaoui, San Carlos, CA (US); Sandeep Agarwal, Fremont, CA (US); Jayant Vivrekar, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 689 days.

(21) Appl. No.: 11/897,681

(22) Filed: Aug. 31, 2007

(65) Prior Publication Data

US 2008/0129264 A1    Jun. 5, 2008

Related U.S. Application Data (60) Provisional application No. 60/850,188, filed on Oct. 6, 2006.

(51) Int. Cl.
*G05F 1/00*    (2006.01)
(52) U.S. Cl. .................. 323/282; 323/222; 323/271
(58) Field of Classification Search .............. 323/222, 323/235, 241, 271, 280, 282, 283
See application file for complete search history.

(56) References Cited

U.S. PATENT DOCUMENTS

| | | | | |
|---|---|---|---|---|
| 6,388,429 B1 * | 5/2002 | Mao | | 323/222 |
| 6,828,766 B2 * | 12/2004 | Corva et al. | | 323/284 |
| 7,292,014 B2 * | 11/2007 | Lee et al. | | 323/266 |
| 2004/0232895 A1 * | 11/2004 | Chiu et al. | | 323/234 |
| 2005/0128005 A1 | 6/2005 | Li et al. | | |
| 2007/0080671 A1 * | 4/2007 | Qahouq et al. | | 323/282 |

* cited by examiner

*Primary Examiner* — Adolf Berhane
*Assistant Examiner* — Nguyen Tran
(74) *Attorney, Agent, or Firm* — Paul A. Bernkopf; Graybeal Jackson LLP; Bryan A. Santarelli (57) ABSTRACT

An embodiment of a hysteretic power-supply controller includes a signal generator, frequency adjuster, and signal combiner. The signal generator is operable to generate a switching signal having a first level in response to a control signal being greater than a first reference value and having a second level in response to the control signal being less than a second reference value, the switching signal having an actual frequency and being operable to drive a switching stage that generates a regulated output signal. The frequency adjuster is operable to generate a frequency-adjust signal that is related to a difference between the actual frequency and a desired frequency. And the signal combiner is operable to generate the control signal from the frequency-adjust signal and the regulated output signal. Such a hysteretic power-supply controller may allow one to set the switching frequency to a desired value independently of the parameters of the power supply.

22 Claims, 6 Drawing Sheets

FIG. 7

HYSTERETIC POWER-SUPPLY CONTROLLER WITH ADJUSTABLE SWITCHING FREQUENCY, AND RELATED POWER SUPPLY, SYSTEM, AND METHOD

CLAIM OF PRIORITY

This application claims priority to U.S. Provisional Application Ser. No. 60/850,188, filed on Oct. 6, 2006, which is incorporated by reference.

BACKGROUND

Figure 1:
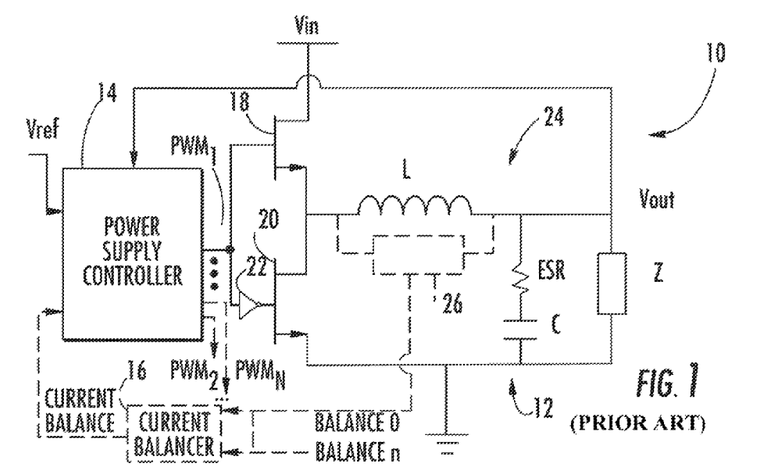
FIG. 1 is a schematic diagram of a prior hysteretic power supply and a load powered by the supply.

FIG. 1 is a schematic diagram of a known hysteretic power supply 10 for providing a regulated output voltage $V_{out}$ to a load Z.

The power supply 10 includes n switching stages 12 (only one stage shown) and a hysteretic power-supply controller 14, which generates a respective switching signal $PWM_1$–$PWM_n$ for each of the n switching stages.

Each switching stage 12 is coupled between an input supply voltage $V_{in}$ and ground, and includes high-side and low-side switching transistors 18 and 20, an inverter 22, and a filter 24, which includes an inductor L and a capacitor C having an equivalent series resistance ESR. A stage 12 is "on" when the respective switching signal PWM has a high level such that the high-side transistor 18 conducts like a closed switch and the low-side transistor does not conduct like an open switch; conversely, a stage is "off" when the high-side transistor does not conduct and the low-side transistor conducts.

For n>1, the switching signals $PWM_1$–$PWM_n$ each have the same frequency, but have a respective phase such that only one stage 12 is "on" at any given time. Also for n>1, the power supply 10 may include an optional current balancer 16 for equalizing the respective currents provided to the load Z by the n switching stages 12. An example of such a current balancer is described in U.S. 2005/0128005A1.

Where the power supply 10 includes the current balancer 16, then each switching stage 12 may include a current sensor 26, which provides to the current balancer 16 a respective BALANCE signal that indicates the amount of current that the switching stage is sourcing to the load Z.

Figures 2A, 2B:
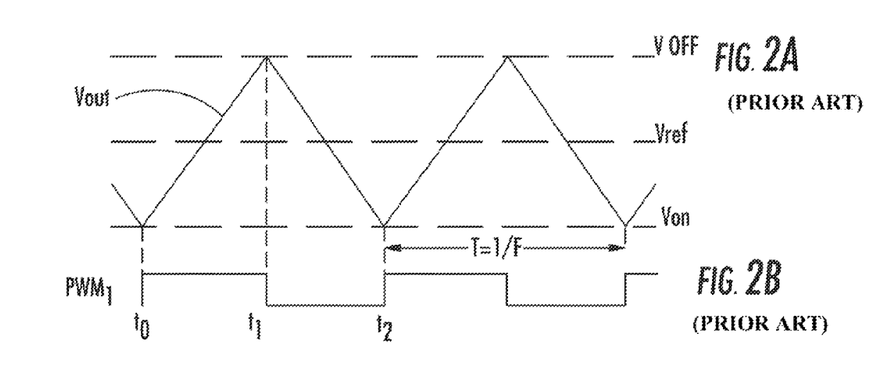
FIG. 2A is a timing diagram of the regulated output voltage generated by the power supply of FIG. 1.
FIG. 2B is a timing diagram of the switching signal generated by the power-supply controller of FIG. 1.

FIG. 2A is a diagram of the regulated output $V_{out}$ of FIG. 1 having a steady-state ripple component of frequency F (period T=1/F), and FIG. 2B is a diagram of the switching signal $PWM_1$ of FIG. 1 also having the frequency F. It is understood that for n>1, $PWM_2$–$PWM_n$ (not shown) are phase shifted relative to $PWM_1$, but are otherwise the same (e.g., the same frequency and the same duty cycle) as $PWM_1$.

Referring to FIGS. 1-2B, the operation of the power supply 10 is discussed.

At time $t_0$, the power-supply controller 14 transitions $PWM_1$ to a high level, and thus causes the high-side transistor 18 to close and the low-side transistor 20 to open.

The closed high-side transistor 18 causes a linearly increasing current to flow from the input supply voltage $V_{in}$, through the high-side transistor and the inductor L, and to the capacitor C and load Z.

The portion of this increasing current flowing through the ESR causes $V_{out}$ to linearly increase—the increase in $V_{out}$ due to the charging of the capacitor C is ignored for purposes of this discussion.

At time $t_1$, $V_{out}$ equals or exceeds a predetermined voltage threshold $V_{off}$, and, in response, the power-supply controller 14 transitions $PWM_1$ to a low level, thus causing the high-side transistor 18 to open and the low-side transistor 20 to close.

The closed low-side transistor 20 allows a linearly decreasing current to flow from ground, through the low-side transistor and the inductor L, and to the capacitor C and load Z.

The portion of this decreasing current flowing through the ESR causes $V_{out}$ to linearly decrease—again, the change in $V_{out}$ due to the change in the voltage across the capacitor C is ignored.

When $V_{out}$ equals or is less than a predetermined voltage threshold $V_{on}$ at time $t_2$, then the power-supply controller 14 transitions $PWM_1$ to a high level, and the above-described cycle repeats. Furthermore, although the slopes of the increasing and decreasing portions of the $V_{out}$ ripple component are shown having the same magnitudes, these slopes may have different magnitudes depending on the load Z and the values of $V_{in}$, L, and C.

In the above-described manner, the power-supply controller 14 maintains the steady-state ripple component of $V_{out}$ symmetric about a predetermined reference $V_{ref}$, and thus maintains the steady-state average of $V_{out}$ equal to $V_{ref}$.

Still referring to FIGS. 1-2B, one may desire to select a switching frequency F for a given application of the hysteretic power supply 10. For example, one may desire to increase F so that he can decrease the sizes of L and/or C. Or, one may desire to increase F to reduce the amplitude of the $V_{out}$ ripple component, or to meet RF emission requirements.

But unfortunately, it may be difficult or impossible to change the switching frequency F without redesigning the power supply 10. The switching frequency F has a "natural" value that depends, e.g., on the values of $V_{in}$, L, C, and Z (the "natural" value of F may also depend on the parasitic resistances, capacitances, and inductances associated with the circuit board on which the power supply 10 is disposed, and on the parasitic resistances in L and C (ESR)). That is, one typically cannot set F independently of $V_{in}$, L, C, and Z. Therefore, to change the switching frequency F to a desired value, a designer typically must change one or more of $V_{in}$, L, and C for a given Z, which typically has a value that is specified by a customer, and is thus unchangeable. But because the power-supply 10 uses feedback to regulate $V_{out}$, changing one or more of $V_{in}$, L, and C may change the frequency response of the power supply 10, and thus alter the supply's stability characteristics. Consequently, changing the switching frequency F may entail a relatively time-consuming redesign of the power supply 10 to insure that the supply has the desired frequency response and is not unstable.

Furthermore, a customer may desire to change the load Z without changing the switching frequency F or the values of $V_{in}$, L, and C.

But unfortunately, it may be difficult or impossible to change the load Z without changing the switching frequency F and the values of $V_{in}$, L, and C because F depends on Z as discussed above.

Referring to FIGS. 1-2A, another problem with the power supply 10 is that noise may cause jitter in the switching frequency F, and this jitter may generate RF emissions that interfere with the operation of the power supply, with the operation of other portions of a system in which the power supply is disposed, or with the operation of a device external to the system. Referring to FIG. 2A, the amplitude of the steady-state $V_{out}$ ripple component may be relatively small, on the order of a few millivolts. Therefore, noise on $V_{out}$ may randomly shift the points at which $V_{out}$ crosses $V_{off}$ and $V_{on}$, thus causing jitter in the rising and falling edges of $PWM_1$.

SUMMARY

An embodiment of a power-supply controller includes a signal generator, frequency adjuster, and signal combiner.

The signal generator is operable to generate a switching signal having a first level in response to a control signal being greater than a first reference value and having a second level in response to the control signal being less than a second reference value, the switching signal having an actual frequency and being operable to drive a switching stage that generates a regulated output signal. The frequency adjuster is operable to generate a frequency-adjust signal that is related to a difference between the actual frequency and a desired frequency. And the signal combiner is operable to generate the control signal from the frequency-adjust signal and the regulated output signal.

Such a power-supply controller may allow one to set the switching frequency of a hysteretic power supply to a desired value independently of the parameters (e.g., input voltage, filter components, and load) of the power supply. Consequently, one may be able to set the switching frequency to other than the power supply's "natural" frequency without redesigning the supply.

Furthermore, such a power-supply controller may reduce noise-induced jitter in the switching frequency as compared to prior power-supply controllers, or may eliminate such jitter.

DETAILED DESCRIPTION

The following discussion is presented to enable a person skilled in the art to make and use one or more embodiments of the invention. The general principles described herein may be applied to embodiments and applications other than those detailed below without departing from the spirit and scope of the invention. Therefore the present invention is not intended to be limited to the embodiments shown, but is to be accorded the widest scope consistent with the principles and features disclosed or suggested herein.

Figure 3:
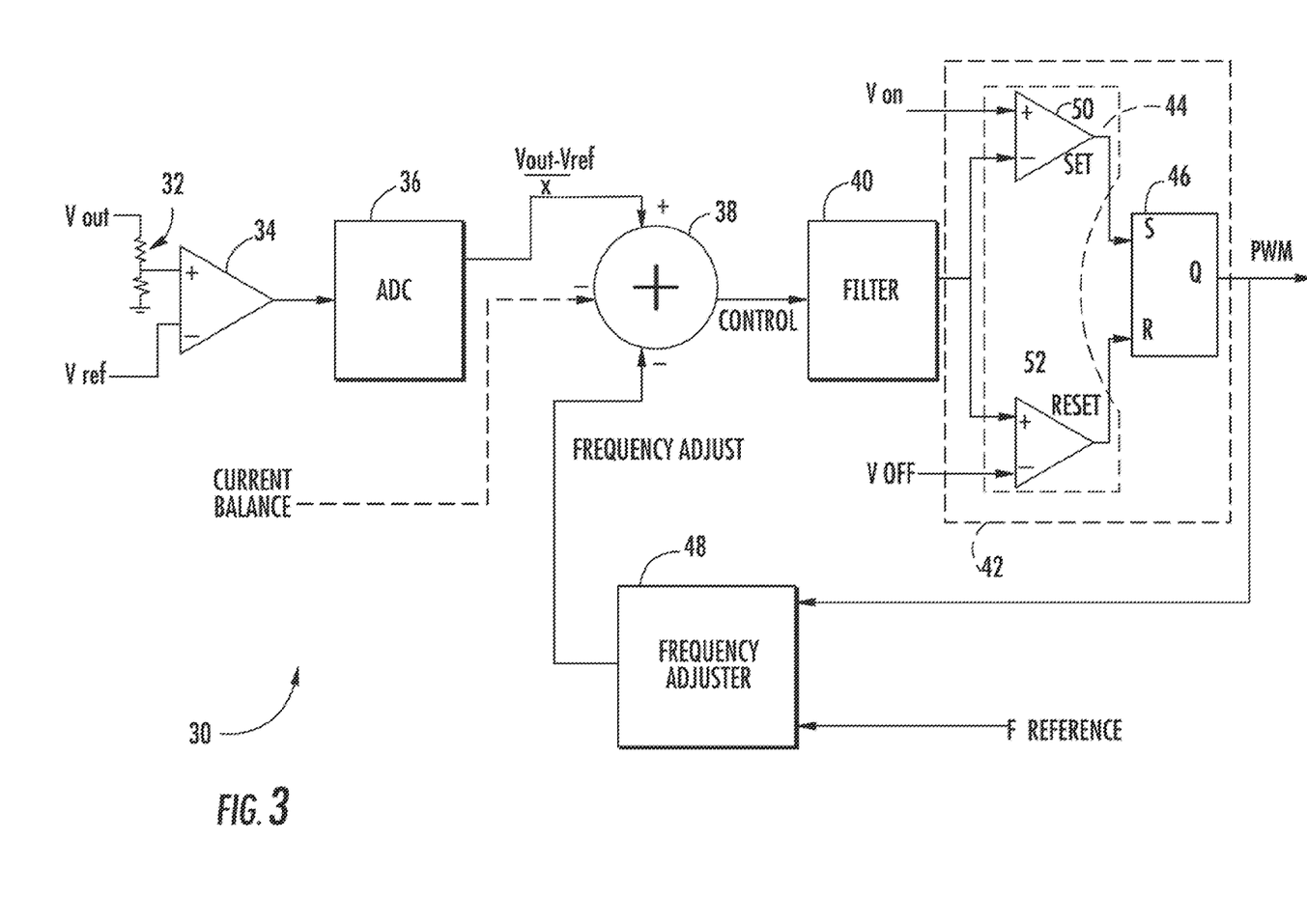
FIG. 3 is a schematic diagram of a hysteretic power-supply controller according to an embodiment of the invention.

FIG. 3 is a schematic diagram of a hysteretic power-supply controller 30 according to an embodiment of the invention. The controller 30 may allow one to set the switching frequency of a hysteretic power supply independently of the parameters (e.g., input voltage, filter components, and load) of the power supply. Furthermore, the controller 30 may reduce the sensitivity of the switching frequency to noise, and may thus reduce or eliminate jitter in the switching frequency.

The power-supply controller 30 includes a voltage divider 32, a differential amplifier 34, an analog-to-digital converter (ADC) 36, a signal combiner (here a summer) 38 for generating a control signal, a low-pass filter 40, a signal generator 42, which generates the switching signal PWM and which includes a window comparator 44 and an R/S flip-flop 46, and a frequency adjuster 48 for generating a frequency-adjust signal.

The differential amplifier 34 amplifies a difference between $V_{ref}$ and a fraction $1/x$ of the regulated output voltage $V_{out}$ generated by the divider 32.

The ADC 36 digitizes the amplified difference $$\frac{V_{out}}{x} - V_{ref}$$

from the amplifier 34.

The summer 38 generates a control signal by adding the digitized difference from the ADC 36 to a digital frequency-adjust signal from the frequency adjuster 48—the frequency-adjust signal is input to an inverting terminal of the summer to account for the phase shift of the frequency-adjust signal relative to the ripple component of $V_{out}$. Where a power supply incorporating the controller 30 includes multiple switching stages (not shown in FIG. 3), the summer 38 may generate the control signal by adding to the digitized difference $$\frac{V_{out}}{x} - V_{ref}$$

and to the frequency-adjust signal a digitized current-balance signal such as described above in conjunction with FIG. 1.

The filter 40 filters the control signal from the summer 38, and the signal generator generates the switching signal PWM from the filtered control signal. Specifically, a first comparator 50 of the window comparator 44 generates a SET signal when the filtered control signal is less than the reference voltage $V_{on}$, and a second comparator 52 of the window comparator generates a RESET signal when the filtered control signal equals or is greater than the reference voltage $V_{off}$, where $V_{off} > V_{on}$—per FIG. 2A, $V_{ref}$ is approximately halfway between $V_{off}$ and $V_{on}$. The flip-flop 46 generates the switching signal PWM having a high, i.e., "on", level in response to the SET signal, and generates PWM having a low, i.e., "off", level in response to the RESET signal.

The frequency adjuster 48 compares the actual switching frequency $F_{actual}$ of the PWM signal with a desired switching frequency $F_{reference}$, and generates the frequency-adjust signal having a wave shape, a frequency, and an amplitude that cause $F_{actual}$ to converge toward, and then substantially equal, $F_{reference}$.

Figure 4A:
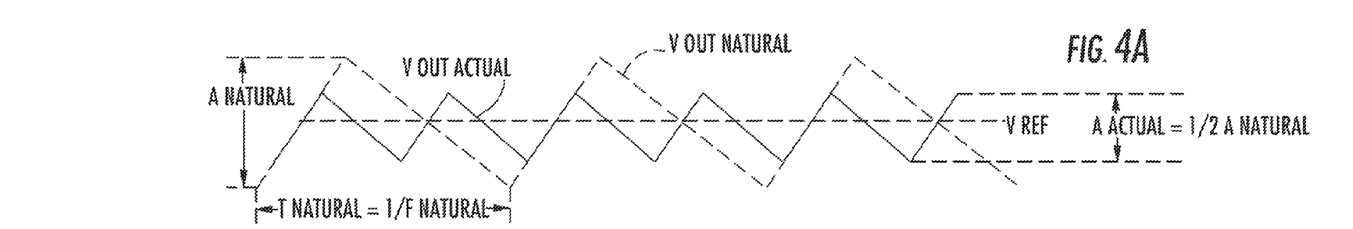
FIG. 4A is a timing diagram of the regulated output voltage (solid line) generated by a power supply that incorporates the power-supply controller of FIG. 3 according to an embodiment of the invention.
Figure 4B:
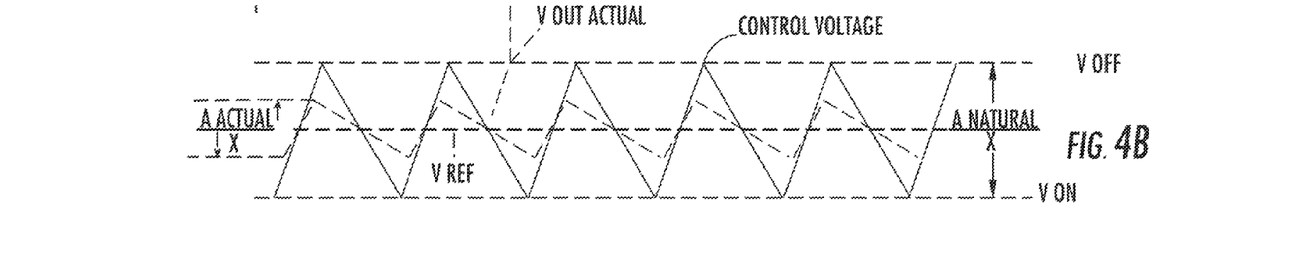
FIG. 4B is a timing diagram of the control voltage (solid line) generated by the power-supply controller of FIG. 3 according to an embodiment of the invention.
Figures 4C, 4D:
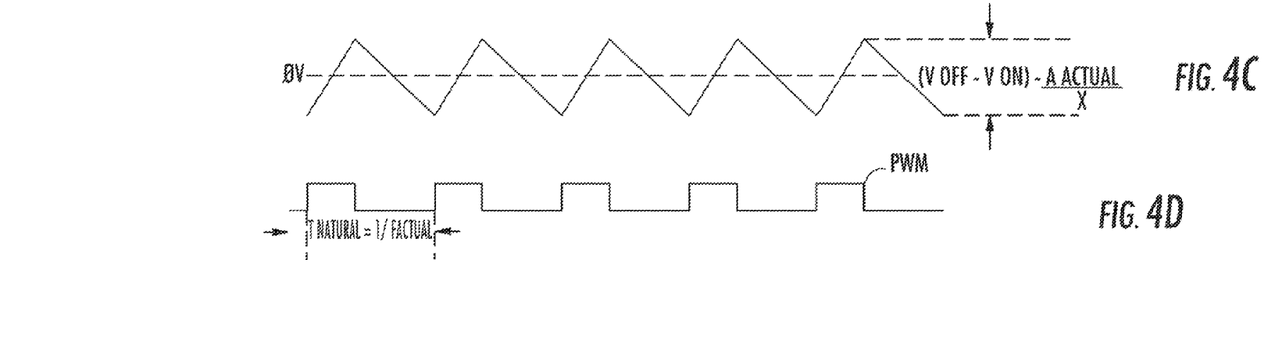
FIG. 4C is a timing diagram of the frequency-adjust voltage generated by an embodiment of the power-supply controller of FIG. 3 according to an embodiment of the invention.
FIG. 4D is a timing diagram of the switching signal generated by the power-supply controller of FIG. 3 according to an embodiment of the invention.

Referring to FIGS. 3-4D, the operation of a hysteretic power supply incorporating the power-supply controller 30 is discussed according to an embodiment where the desired switching frequency $F_{reference}$ is twice the "natural" switching frequency of the power supply. In this embodiment, the power supply is the power supply 10 of FIG. 1, except that the power-supply controller 14 (FIG. 1) is replaced with the power-supply controller 30 (FIG. 3), and the load Z (FIG. 1) is reduced such that the decreasing portion of the $V_{out}$ ripple component has a smaller slope than the increasing portion.

FIG. 4A is a timing diagram of the actual regulated output voltage $V_{outactual}$ (solid line) generated by the power supply incorporating the controller 30 of FIG. 3 according to an embodiment of the invention. $V_{outactual}$ is shown overlaying the "natural" regulated output voltage $V_{outnatural}$ (dashed line) that the power supply would generate without the adjustment of the switching frequency by the controller 30.

FIG. 4B is a timing diagram of the control voltage (solid line) from the filter 40 of FIG. 3 overlaying $$\frac{V_{outactual}}{x}$$

(dashed line) of FIG. 4A according to an embodiment of the invention.

FIG. 4C is a timing diagram of the frequency-adjust voltage from the frequency adjuster 48 of FIG. 3 according to an embodiment of the invention.

FIG. 4D is a timing diagram of the switching voltage PWM from the signal generator 42 of FIG. 3 according to an embodiment of the invention.

Referring to FIGS. 1 and 3-4A, because the power-supply controller 30 changes the switching frequency without changing the parameters (e.g., $V_{in}$, L, C, and Z) of the power supply, the slopes of the increasing and decreasing portions of $V_{outactual}$ (solid line in FIG. 4A) are the same as the slopes of the increasing and decreasing portions of $V_{outnatural}$ (dashed line in FIG. 4A). Therefore, because the switching frequency $F_{actual}$ is twice the "natural" frequency $F_{natural}$, the amplitude $A_{actual}$ of $V_{outactual}$ is ½ the amplitude $A_{natural}$ of $V_{outnatural}$.

Referring to FIGS. 1, 3, and 4B, because $V_{off}$ and $V_{on}$ have not changed with the change in the switching frequency, $$V_{off} - V_{on} = \frac{A_{natural}}{x}$$

("x" is the dividing factor of the voltage divider 32 of FIG. 3). But because $A_{actual} = ½ A_{natural}$, $$\frac{V_{outactual}}{x}$$

(dashed line in FIG. 4B) alone is too small to be the control voltage. That is, $$\text{if } \frac{V_{outactual}}{x}$$

alone were used as the control voltage, then $F_{actual}$ would equal $F_{natural}$. Therefore, the summer 38 and filter 40 provide to the window comparator 44 a control voltage (solid line in FIG. 4B) that has the frequency $F_{actual}$ and the amplitude $$\frac{A_{natural}}{x}.$$

That is, the control voltage has the same frequency as, but twice the amplitude of, the ripple component of $$\frac{V_{outactual}}{x}.$$

Consequently, the increasing portion of the control voltage has twice the slope of the increasing portion of $$\frac{V_{outactual}}{x},$$

and the decreasing portion of the control voltage has twice the slope of the decreasing portion of $$\frac{V_{outactual}}{x}.$$

Referring to FIGS. 1, 3, and 4B-4C, to provide the desired control signal (solid line in FIG. 4B), the frequency-adjust voltage from the frequency adjuster 48 is identical to the ripple component of $$\frac{V_{outactual}}{x}.$$

That is, the frequency adjust voltage of FIG. 4C, when added to the ripple component of $$\frac{V_{out} - V_{ref}}{x}$$

by the summer 38, provides the control voltage needed to double the switching frequency from $F_{natural}$ to $F_{actual} = 2 \cdot F_{natural}$. Another way to look at this is that by making the control voltage$=2 \cdot V_{outactual}$, one doubles the switching frequency.

Referring to FIGS. 1, and 3-4D, it is evident from the above example that the power-supply controller 30 can set the switching frequency $F_{actual}$ to any desired frequency $F_{reference}$ by setting the frequency of the control voltage to $F_{reference}$ and by setting the amplitude of the control voltage to $V_{off} - V_{on}$. Specifically, the frequency adjuster 48 so sets the frequency and amplitude of the control voltage by setting the frequency of the frequency-adjust voltage to $F_{reference}$, and by setting the amplitude of the frequency-adjust voltage to $(V_{off} - V_{on}) - A_{actual}$. Of course, because the frequency adjuster 48 is part of a frequency-adjusting feedback loop, the frequency-adjust voltage converges to $F_{reference}$ and to $$(V_{off} - V_{on}) - \frac{A_{actual}}{x}$$

over a transient period having a duration that depends on the frequency response of this feedback loop. Furthermore, although the power-supply controller 30 can theoretically set the switching frequency $F_{actual}$ to any desired value $F_{reference}$, the range of switching frequencies may be constrained by the frequency response of the power supply. For example, a too-low switching frequency may adversely affect the stability of the power supply.

Still referring to FIGS. 1 and 3-4D, in addition to allowing one to set the switching frequency $F_{actual}$ to a value other than $F_{natural}$, the power-supply controller 30 may reduce the noise-induced jitter in $F_{actual}$. Because the frequency-adjust voltage is generated by the frequency adjuster 48, the frequency-adjust voltage typically includes less noise than the ripple component of $V_{outactual}$. Therefore, summing the ripple component of $$\frac{V_{outactual}}{x}$$

with the relatively low-noise frequency-adjust voltage reduces the noise on the control voltage as compared to prior power supplies where the control voltage is substantially equal to the ripple component of $$\frac{V_{outactual}}{x}.$$

Consequently, the reduced noise on the control voltage reduces the jitter in the switching frequency.

Figure 5A:
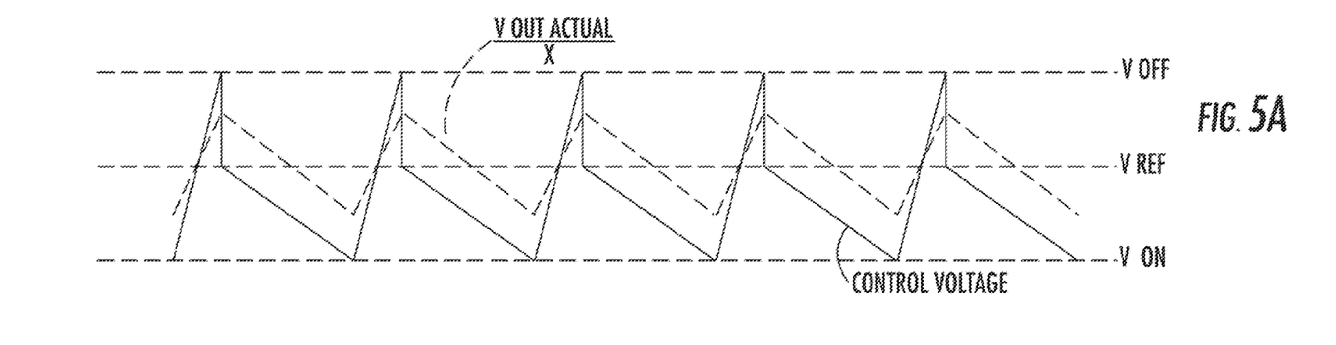
FIG. 5A is a timing diagram of the control voltage (solid line) generated by the power-supply controller of FIG. 3 according to another embodiment of the invention.
Figure 5B:
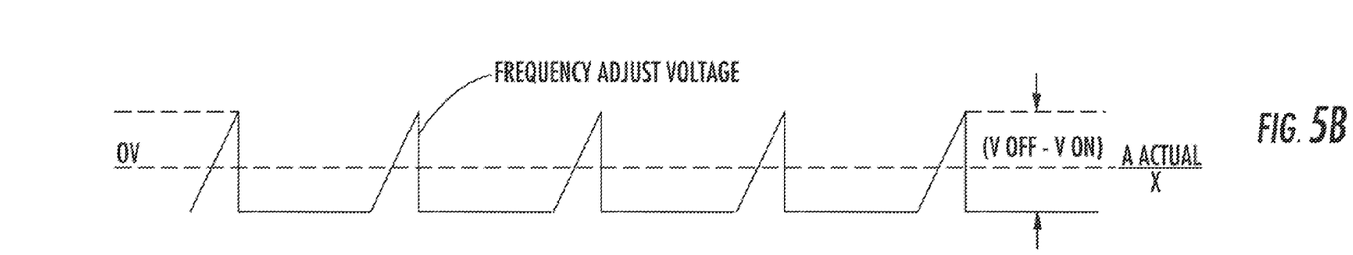
FIG. 5B is a timing diagram of the frequency-adjust voltage generated by the power-supply controller of FIG. 3 according to another embodiment of the invention.

Referring to FIGS. 3 and 5A-5B, the operation of a power supply incorporating the power-supply controller 30 is discussed according to another embodiment where the desired switching frequency $F_{reference}$ is twice the "natural" switching frequency of the power supply. In this embodiment, the power supply is the power supply 10 of FIG. 1, except that the power-supply controller 14 (FIG. 1) is replaced with the power-supply controller 30 (FIG. 3), and the load Z (FIG. 1) is reduced such that the decreasing portion of the $V_{out}$ ripple component has a smaller slope than the increasing portion.

FIG. 5A is a timing diagram of the control voltage (solid line) from the filter 40 of FIG. 3 overlaying $V_{outactual}$ (dashed line) of FIG. 4A according to another embodiment of the invention.

FIG. 5B is a timing diagram of the frequency-adjust voltage from the frequency adjuster 48 of FIG. 3 according to another embodiment of the invention.

The embodiment of the power-supply controller 30 discussed in conjunction with FIGS. 5A-5B is similar to the embodiment discussed above in conjunction with FIGS. 4A-4D, except that the frequency-adjust voltage of FIG. 5B is a single-ramp voltage (positive slope), not a dual-ramp voltage (positive and negative slope) like the frequency-adjust voltage of FIG. 4C. By generating only a single-ramp voltage, the frequency adjuster 48 (FIG. 3) may be less complex and occupy a smaller circuit area than a dual-ramp frequency adjuster.

Referring to FIG. 5A, although the control voltage has a different shape than the control voltage of FIG. 4B, it has the same amplitude $(V_{off}-V_{on})$ and frequency $(F_{actual}=2 \cdot F_{natural})$ as the control voltage of FIG. 4B, and thus generates the same $V_{outactual}$ as the control voltage of FIG. 4B does. That is, the shape of the ripple component of $V_{outactual}$ depends only on the frequency and amplitude of the control voltage, not on the shape of the control voltage.

Referring again to FIGS. 3 and 5A-5B, as discussed above in conjunction with FIGS. 4A-4D, the power-supply controller 30 can set the frequency of $V_{outactual}$ to virtually any desired value $F_{reference}$ by setting the frequency of the frequency-adjust voltage to $F_{reference}$ and setting the amplitude of the frequency-adjust voltage to $$(V_{on} - V_{off}) - \frac{A_{actual}}{x}.$$

Referring to FIGS. 3-5B, other embodiments of the power-supply controller 30 are contemplated. For example, instead of generating a frequency-adjust voltage, the controller 30 can set the switching frequency by altering the difference $V_{off}-V_{on}$ or by generating the control voltage from an amplified version of the $V_{out}$ ripple component. But these techniques may increase the noise-induced jitter in the switching frequency. Furthermore, although described as increasing the natural switching frequency $F_{natural}$ to a higher switching frequency $F_{actual}$, the controller 30 may reduce $F_{natural}$ to a lower $F_{actual}$. In one example, the controller 30 does this by setting the frequency of the frequency-adjust voltage to the desired lower frequency and by shifting the phase of the frequency-adjust voltage by 180° relative to the $V_{out}$ ripple component so that the positive and negative slopes of the frequency-adjust voltage are respectively aligned with the negative and positive slopes of the ripple component. In addition, although some components of the power-supply controller 30 are described as operating in the digital domain and other components are described as operating in the analog domain, any of the components can be designed to operate in either the analog or digital domain. Moreover, the controller 30 may include components not shown in FIG. 3, or may lack some of the components shown in FIG. 3. Furthermore, although the control voltage is shown as having relatively sharp peaks, the low-pass filter 40 may cause the peaks of the control voltage to be more rounded by removing higher-frequency components of the signal from the scanner 38.

Figure 6:
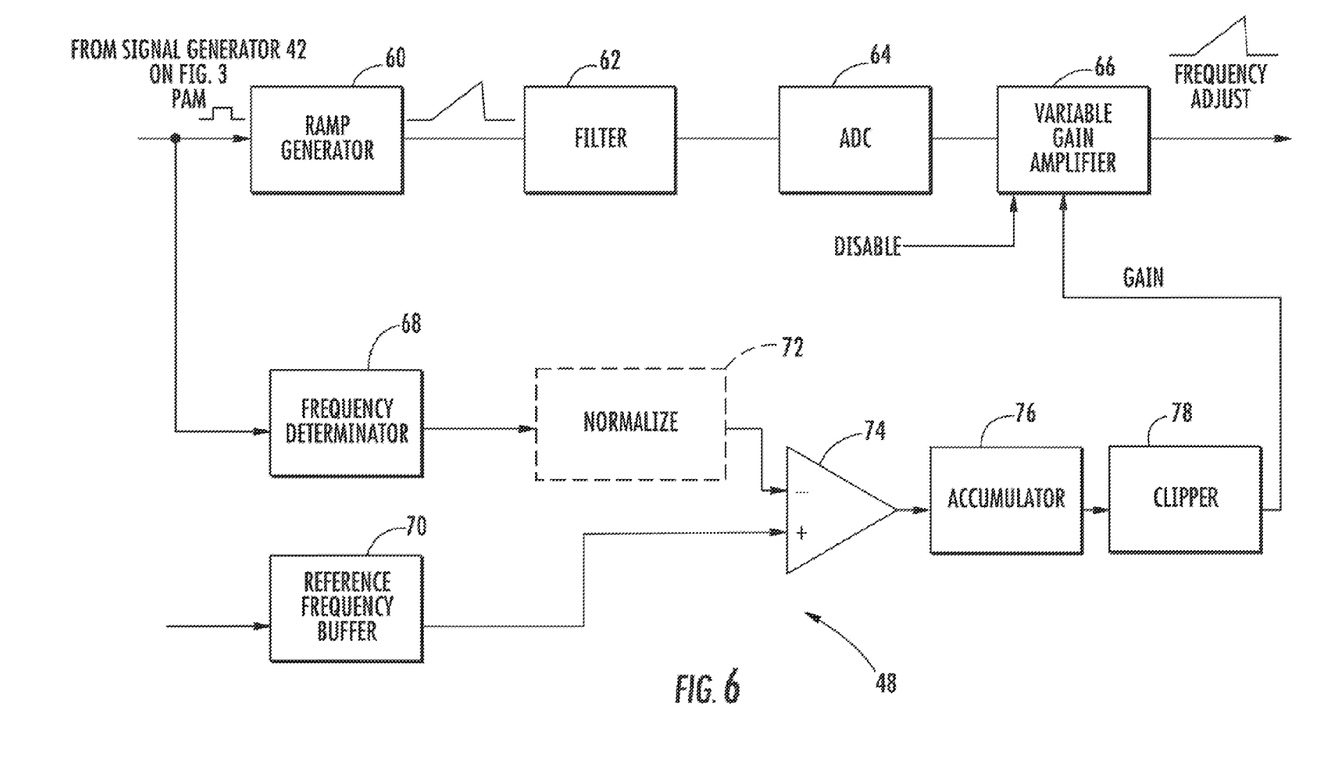
FIG. 6 is a schematic diagram of the frequency adjuster of FIG. 3 according to an embodiment of the invention.

FIG. 6 is a schematic block diagram of the frequency adjuster 48 of FIG. 3 according to an embodiment of the invention where the frequency adjuster is operable to generate the single-ramp frequency-adjust voltage of FIG. 5B.

The frequency adjuster 48 includes a ramp generator 60, a filter 62, an ADC 64, a variable-gain amplifier (VGA) 66, a frequency determiner 68, a reference-frequency buffer 70, an optional frequency normalizer 72, a comparator 74, an accumulator 76, and a clipper 78.

The ramp generator 60 is an analog integrator that generates a single-ramp voltage by integrating the high-level portion of the switching signal PWM from the signal generator 42 (FIG. 3).

The filter 62 is a high-pass filter (e.g., a DC blocking filter) that filters out the DC component of the ramp voltage from the generator 60 to reduce or eliminate any DC error introduction into the output voltage Vout (FIG. 3) by the frequency adjuster 48. But during a transient, the filter 62 may temporarily pass a portion of the DC component to speed up the convergence of $F_{actual}$ to $F_{reference}$.

The ADC 64 digitizes the filtered ramp voltage from the filter 62.

The VGA 66 amplifies the filtered ramp voltage with a gain set by a gain signal. A disable signal can set the gain of the VGA 66 to zero, therefore disabling the frequency adjuster 48 such that the power supply in which the power-supply controller 30 (FIG. 3) is installed operates at its "natural" switching frequency $F_{natural}$.

The frequency determiner 68 determines the actual switching frequency $F_{actual}$ from the switching signal PWM. For example, the determiner 68 may be counter that begins counting at a rising edge of PWM; at the next rising edge of PWM, the value in the $$\text{counter} = T_{actual} = \frac{1}{F_{actual}},$$

and thus represents the inverse of $F_{actual}$.

The reference-frequency buffer 70 stores a digital value that represents $F_{reference}$. Therefore, one can set the switching frequency by loading a digital representation of this frequency into this buffer. For example, where the frequency determiner 68 is a counter, one may load a $$\text{digital value} = \frac{1}{F_{reference}}$$

into the buffer 70.

The optional normalizer 72 converts the value from the frequency determiner 68 into the same "format" as the value from the buffer 70. Where the frequency determiner 68 is a counter, the value generated by the determiner depends on the frequency at which the counter is clocked. Therefore, the normalizer 72 takes the clock frequency into account, and thus makes sure that when $F_{actual}=F_{reference}$, the value from the determiner 68 equals the value stored in the buffer 70. One can, however, omit the normalizer 72 if he accounts for the clock frequency of the determiner 68 by appropriately adjusting the value stored in the buffer 70.

The comparator 74 compares $F_{actual}$ to $F_{reference}$, generates a positive comparison signal if $F_{actual}<F_{reference}$, and generates a negative comparison signal if $F_{actual}>F_{reference}$.

The accumulator 76 integrates the comparison signal from the comparator 74. One can set the frequency response of the frequency-adjust loop by adjusting the bandwidth of the accumulator 76.

Because the accumulator 76 outputs a digital value, the clipper 78 insures that this digital value is within a range compatible with the VGA 66.

Referring to FIGS. 5A-6, the operation of the frequency adjuster 48 is discussed according to an embodiment of the invention. In summary, the frequency adjuster 48 acts as a high-gain differential amplifier that uses negative feedback to cause $F_{actual}$ to converge toward $F_{reference}$ during a transient period, and to cause $F_{actual}$ to equal $F_{reference}$ during a subsequent steady-state period.

The ramp generator 60 integrates the high-level portions of the switching signal PWM and generates zero volts during the low portions to generate a single-ramp voltage, which passes through the filter 62 and is digitized by the ADC 64.

The comparator 74 compares $F_{actual}$ of the switching signal PWM to $F_{reference}$.

If $F_{actual}<F_{reference}$, then the output of the accumulator 76 increases, and thus increases the gain of the VGA 66.

The increased gain of the VGA 66 increases the amplitude of the single-ramp frequency-adjust voltage.

Referring to FIG. 5A, the increased amplitude of the frequency-adjust voltage increases the rising slope and the effective negative slope of the control voltage, and the increased slopes of the control voltage increase the switching frequency $F_{actual}$ toward $F_{reference}$.

Conversely, if $F_{actual}>F_{reference}$, then the output of the accumulator 76 decreases, and thus decreases the gain of the VGA 66.

The decreased gain of the VGA 66 decreases the amplitude of the single-ramp frequency-adjust voltage.

Referring to FIG. 5A, the decreased amplitude of the frequency-adjust voltage decreases the rising slope and the effective negative slope of the control voltage, and the decreased slopes of the control voltage decrease the switching frequency $F_{actual}$ toward $F_{reference}$.

When $F_{actual}=F_{reference}$, the frequency adjuster 48 operates in a steady-state mode to maintain $F_{actual}=F_{reference}$. Specifically, when $F_{actual}=F_{reference}$, the output of the comparator 74 is zero. Therefore, the output of the accumulator 76 settles to a steady-state value, thus also causing the gain of the VGA 66, the amplitude of the frequency-adjust voltage, and the slopes of the control voltage to settle to steady-state values. The steady-state values for the frequency-adjust and control voltages maintain the switching frequency $F_{actual}$ at a steady-state value equal to $F_{reference}$.

Referring to FIGS. 5A-6, other embodiments of the frequency adjuster 48 are contemplated. For example, although described as increasing the natural switching frequency $F_{natural}$ to a higher switching frequency $F_{actual}$, the frequency adjuster 48 may act to reduce $F_{natural}$ to a lower $F_{actual}$. One may accomplish this by loading into the buffer 70 a value for $F_{reference}$ that is lower than $F_{natural}$, and allowing the VGA 66 to have a negative gain so as to shift the phase of the frequency-adjust voltage by 180° relative to the ripple component of $V_{outactual}$. Furthermore, although some components of the frequency adjuster 48 are described as operating in the digital domain and other components are described as operating in the analog domain, any of the components can be designed to operate in either the analog or digital domain. In addition, the frequency adjuster 48 may include components not shown in FIG. 6, or may lack some of the components shown in FIG. 6.

Figure 7:
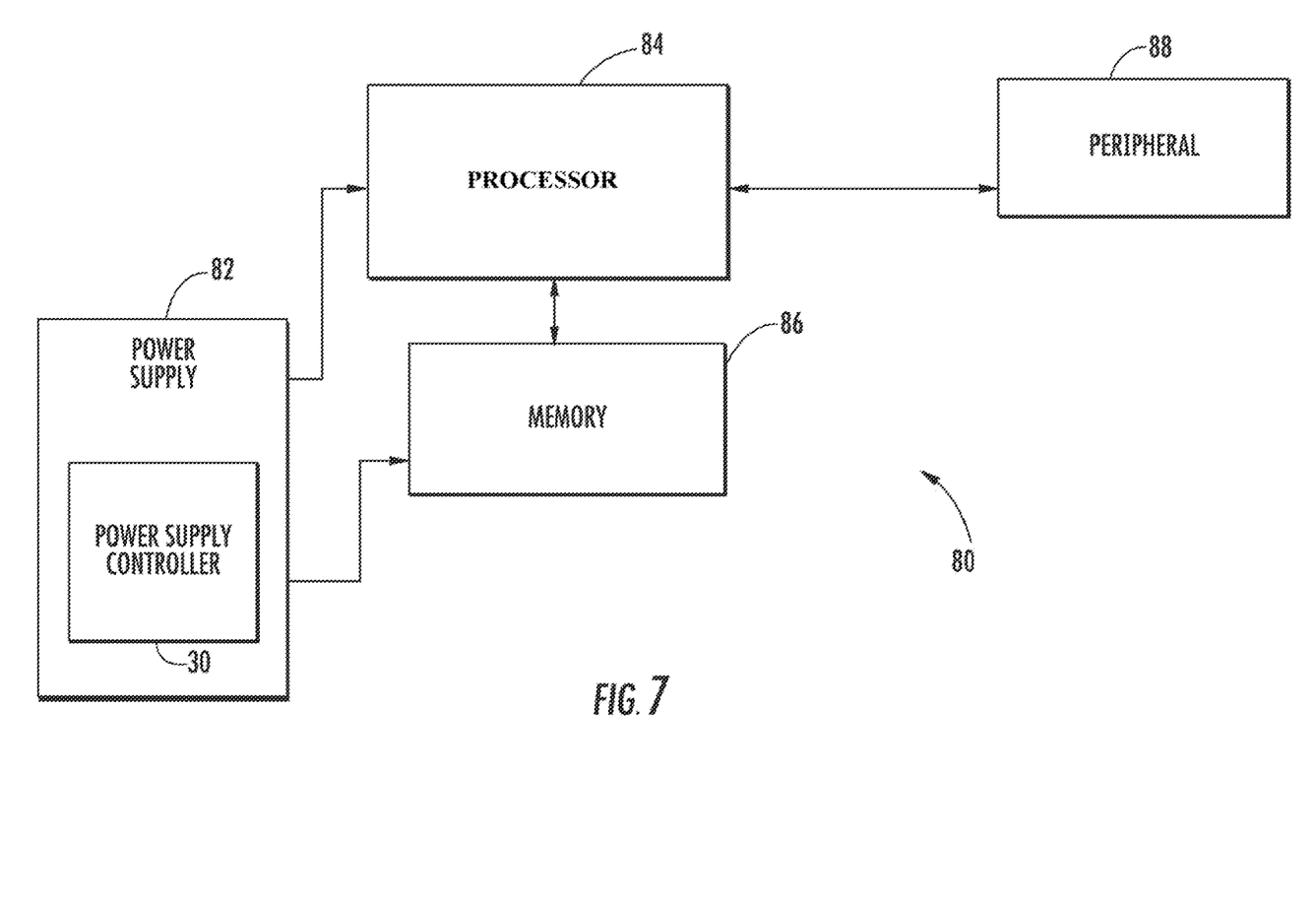
FIG. 7 is a schematic diagram of a computer system including a power supply that incorporates the power-supply controller of FIG. 3 according to an embodiment of the invention.

FIG. 7 is a schematic block diagram of a computer system 80 that includes a power supply 82 having the power-supply controller 30 of FIG. 3 according to an embodiment of the invention. For example, the power supply 82 may be the same as the power supply 10 of FIG. 1 but with the power-supply controller 30 replacing the controller 14 (FIG. 1).

In addition to the power supply 82, the system 80 includes a processor 84, a memory 86, and a peripheral 88. Although shown as providing power to both the processor 84 and the memory 86, the supply 82 may provide power to only one of the processor and memory, or to one or more other components of the system 80 not shown in FIG. 7.

The memory 84 may include semiconductor memory such as RAM or flash memory, and/or may include storage devices such as a hard-disk drive or optical-disk drive.

The peripheral 86 may include a data-input device such as a mouse or keyboard, and/or may include a data-output device such as a monitor or a printer.

The computer system 80 may also include other components that are not shown in FIG. 7.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A power-supply controller, comprising:
a signal generator operable to generate a switching signal having a first level in response to a control signal being greater than a first reference value and having a second level in response to the control signal being less than a second reference value, the switching signal having an actual frequency and being operable to drive a switching stage that generates a regulated output signal;
a frequency adjuster coupled to the signal generator and operable to generate a frequency-adjust signal that is related to a first difference between the actual frequency and a desired frequency; and
a signal combiner coupled to the frequency adjuster and operable to generate the control signal from the frequency-adjust signal and the regulated output signal.

2. The power-supply controller of claim 1 wherein:
the first level comprises a switching-stage-off level; and
the second level comprises a switching-stage-on level.

3. The power-supply controller of claim 1 wherein the signal generator comprises:
a window comparator operable to generate a first signal in response to the control signal being greater than the first reference value and to generate a second signal in response to the control signal being less than the second reference value; and
a flip-flop operable to generate the switching signal having the first level in response to the first signal and to generate the switching signal having the second level in response to the second signal.

4. A power-supply controller, comprising:
a signal generator operable to generate a switching signal having a first level in response to a control signal being greater than a first reference value and having a second level in response to the control signal being less than a second reference value, the switching signal having an actual frequency and being operable to drive a switching stage that generates a regulated output signal;
a frequency adjuster coupled to the signal generator and operable to generate a frequency-adjust signal that is related to a first difference between the actual frequency and a desired frequency;
a signal combiner coupled to the frequency adjuster and operable to generate the control signal from the frequency-adjust signal and the regulated output signal;
wherein the signal generator comprises:
a window comparator operable to generate a first signal in response to the control signal being greater than the first reference value and to generate a second signal in response to the control signal being less than the second reference value; and
a flip-flop operable to generate the switching signal having the first level in response to the first signal and to generate the switching signal having the second level in response to the second signal; and
wherein the frequency adjuster comprises:
an integrator operable to generate a ramp signal from the switching signal;
a variable-gain amplifier coupled to the integrator, operable to amplify the ramp signal with a gain that is related to a gain-control signal, and operable to generate the frequency-adjust signal from the amplified ramp signal;
a frequency determiner operable to generate a frequency value that represents the frequency of the switching signal;
a comparator operable to compare the frequency value to the desired frequency and to generate a comparison signal; and
an accumulator operable to generate the gain-control signal from the comparison signal.

5. The power-supply controller of claim 1 wherein the signal combiner comprises an adder operable to generate the control signal from a sum of the frequency-adjust signal and a ripple component of the regulated output signal.

6. The power-supply controller of claim 1 wherein the control signal is operable to cause the actual frequency of the switching signal to substantially equal the desired frequency.

7. The power-supply controller of claim 1, further comprising a low-pass filter disposed between the signal generator and the signal combiner.

8. A power-supply controller, comprising:
a signal generator operable to generate a switching signal having a first level in response to a control signal being greater than a first reference value and having a second level in response to the control signal being less than a second reference value, the switching signal having an actual frequency and being operable to drive a switching stage that generates a regulated output signal;
a frequency adjuster coupled to the signal generator and operable to generate a frequency-adjust signal that is related to a first difference between the actual frequency and a desired frequency;
a signal combiner coupled to the frequency adjuster and operable to generate the control signal from the frequency-adjust signal and the regulated output signal;
an amplifier operable to generate a second difference between the regulated output signal and a reference signal; and
wherein the signal combiner comprises an adder operable to generate the control signal from a sum of the frequency-adjust signal and the second difference.

9. A power supply, comprising:
a first switching stage operable to generate a regulated output voltage in response to a first switching signal having an actual frequency; and
a power-supply controller including
a signal generator operable to generate the first switching signal having a first level in response to a control signal being greater than a first reference value and having a second level in response to the control signal being less than a second reference value;
a first feedback loop including a frequency adjuster coupled to the signal generator and operable to generate a frequency-adjust signal that is related to a first difference between the actual frequency and a desired frequency; and
a signal combiner coupled to the frequency adjuster and operable to generate the control signal from the frequency-adjust signal and the regulated output voltage.

10. The power supply of claim 9 wherein the first switching stage comprises:
first and second supply nodes;
a stage input node operable to receive the control signal;
a stage output node operable to provide the regulated output voltage;
a first switch having a control node coupled to the input node, a first conduction node coupled to the first supply node, and a second conduction node;
a second switch having a control node coupled to the input node, a first conduction node coupled to the second conduction node of the first switch, and a second conduction node coupled to the second supply node; and a filter having a filter input node coupled to the second conduction node of the first switch and having a filter output node coupled to the stage output node.

11. The power supply of claim 10 wherein the filter comprises:
    an inductor coupled between the filter input and output nodes; and
    a capacitor coupled between the filter output node and the second supply node.

12. The power supply of claim 9 wherein the control signal is operable to cause the actual frequency of the switching signal to substantially equal the desired frequency.

13. A power supply, comprising:
    a first switching stage operable to generate a regulated output voltage in response to a first switching signal having an actual frequency; and
    a power-supply controller including:
        a signal generator operable to generate the first switching signal having a first level in response to a control signal being greater than a first reference value and having a second level in response to the control signal being less than a second reference value;
        a first feedback loop including a frequency adjuster coupled to the signal generator and operable to generate a frequency-adjust signal that is related to a first difference between the actual frequency and a desired frequency;
        a signal combiner coupled to the frequency adjuster and operable to generate the control signal from the frequency-adjust signal and the regulated output voltage;
        a second feedback loop including an amplifier operable to generate a second difference between the regulated output voltage and a reference voltage; and
        wherein the signal combiner comprises an adder operable to generate the control signal from a sum of the frequency-adjust signal and the second difference.

14. The power supply of claim 9, further comprising:
    wherein the first switching signal has a duty cycle and a first phase;
    a second switching stage operable to generate the regulated output voltage in response to a second switching signal having the actual frequency, the duty cycle, and a second phase that is shifted by a predetermined amount relative to the first phase; and
    wherein the signal generator is operable to generate the second switching signal.

15. A power supply, comprising:
    a first switching stage operable to generate a regulated output voltage in response to a first switching signal having an actual frequency; and
    a power-supply controller including:
        a signal generator operable to generate the first switching signal having a first level in response to a control signal being greater than a first reference value and having a second level in response to the control signal being less than a second reference value;
        a first feedback loop including a frequency adjuster coupled to the signal generator and operable to generate a frequency-adjust signal that is related to a first difference between the actual frequency and a desired frequency; and
        a signal combiner coupled to the frequency adjuster and operable to generate the control signal from the frequency-adjust signal and the regulated output voltage;
    wherein the first switching signal has a duty cycle and a first phase;
    wherein the first switching stage is operable to generate a first current signal related to an amount of output current that the first switching stage provides;
    a second switching stage operable to generate the regulated output voltage in response to a second switching signal having the actual frequency, the duty cycle, and a second phase that is shifted by a predetermined amount relative to the first phase, the second switching stage further operable to generate a second current signal related to an amount of output current that the second switching stage provides;
    wherein the signal generator is operable to generate the second switching signal;
    wherein the power-supply controller further includes a current balancer operable to generate a balance signal from the first and second current signals; and
    wherein the signal combiner is operable to generate the control signal from the frequency-adjust signal, the regulated output voltage, and the balance signal.

16. An electronic system, comprising:
    a power supply including
        a switching stage operable to generate a regulated output voltage in response to a switching signal having an actual frequency; and
        a power-supply controller including
            a signal generator operable to generate the switching signal having a first level in response to a control signal being greater than a first reference value and having a second level in response to the control signal being less than a second reference value;
            a feedback loop including a frequency adjuster coupled to the signal generator and operable to generate a frequency-adjust signal that is related to a first difference between the actual frequency and a desired frequency; and
            a signal combiner coupled to the frequency adjuster and operable to generate the control signal from the frequency-adjust signal and the regulated output voltage.

17. A method, comprising:
    generating a regulated output signal in response to a switching signal having an actual frequency;
    generating the switching signal having a first level in response to a control signal being greater than a first reference value and having a second level in response to the control signal being less than a second reference value; and
    adjusting the control signal to cause the actual frequency to substantially equal a reference frequency.

18. The method of claim 17 wherein adjusting the control signal comprises adjusting the control signal to cause a difference between the actual and predetermined frequencies to substantially equal a predetermined value.

19. The method of claim 17, further comprising:
    generating the control signal having an amplitude and a ramped portion; and
    wherein adjusting the control signal comprises adjusting the amplitude of the control signal.

20. A method, comprising:
    generating a regulated output signal in response to a switching signal having an actual frequency;
    generating the switching signal having a first level in response to a control signal being greater than a first reference value and having a second level in response to the control signal being less than a second reference value;

adjusting the control signal to cause the actual frequency to substantially equal a predetermined frequency;

integrating the switching signal to generate a ramp signal having an amplitude;

adjusting the amplitude of the ramp signal based on a difference between the actual and predetermined frequencies; and generating the control signal from the amplitude-adjusted ramp signal and a ripple component of the regulated output signal.

21. A method, comprising:

generating a regulated output signal in response to a switching signal having a switching frequency;

generating the switching signal having a first level in response to a control signal being greater than a first reference value and having a second level in response to the control signal being less than a second reference value;

generating a frequency-adjust signal that is related to a first difference between the switching frequency and a predetermined frequency; and adjusting the control signal with the frequency-adjust signal to cause the switching frequency to substantially equal the predetermined frequency.

22. A method, comprising:

generating a regulated output signal in response to a switching signal having a switching frequency;

generating the switching signal having a first level in response to a control signal being greater than a first reference value and having a second level in response to the control signal being less than a second reference value;

generating a frequency-adjust signal that is related to a first difference between the switching frequency and a predetermined frequency; and generating the control signal from the frequency-adjust signal and the regulated output signal.

* * * * *